United States Patent [19]

Bostelman

[11] Patent Number: 5,295,601

[45] Date of Patent: Mar. 22, 1994

[54] CAULK CARTRIDGE CAP

[76] Inventor: Richard F. Bostelman, 22381 Banner School Rd., Rte. 2, Defiance, Ohio 43512

[21] Appl. No.: 868,248

[22] Filed: Apr. 14, 1992

[51] Int. Cl.$^5$ .............................................. B65D 51/00
[52] U.S. Cl. ................................... 220/287; 220/375; 220/727; 215/356; 215/320; 215/306; 215/33; 222/151; 222/543; 222/546; 222/554; 222/563
[58] Field of Search .................. 220/287, 375, 727; 215/354, 356, 319, 320, 306, 334, 33; 222/151, 543, 546, 554, 563

[56] References Cited

U.S. PATENT DOCUMENTS

| | | | |
|---|---|---|---|
| 2,731,053 | 1/1956 | Lockhart | 222/546 X |
| 4,340,148 | 7/1982 | Beckham | 215/320 X |
| 5,154,327 | 10/1992 | Long | 222/546 X |

FOREIGN PATENT DOCUMENTS

| | | | |
|---|---|---|---|
| 563959 | 1/1958 | Belgium | 215/354 |
| 939814 | 11/1948 | France | 215/354 |
| 572309 | 1/1958 | Italy | 222/543 |

Primary Examiner—Allan W. Shoap
Assistant Examiner—Paul A. Schwarz
Attorney, Agent, or Firm—S. Michael Bender

[57] ABSTRACT

A caulk cartridge cap is designed to enable the storage of unused portions of products of the types supplied within caulk cartridge type containers to thus maintain them in a reusable condition. The cap operates as a closure for purposes of resealing a caulk type cartridge to prevent the premature drying out or aging of the materials stored within the cartridge and to also prevent blockage within the cartridge applicator tube. The cap includes an orifice retention rod which is positionable within the applicator tube, and a self-threading insert positioned within the cap is then used to threadably attach the cap to the cartridge. Modified embodiments of the cap include the use of a tether, a scraping edge formed on the orifice retention rod, and a bracket assembly to which the cap is rotatably attached and which may be mounted to a conventional caulk cartridge holding gun.

6 Claims, 4 Drawing Sheets

CAULK CARTRIDGE CAP

BACKGROUND OF THE INVENTION

1. Field of the Invention

The present invention relates to closures, and more particularly pertains to a cap which may be used to seal a caulk cartridge type container.

2. Description of the Prior Art

The use of closures to seal open containers is known in the prior art. Regardless of the fact that there are literally thousands of different types of closures and caps available for sealing containers, there has apparently been no attempt to provide a reusable closure for a caulk cartridge type container so as to prevent the drying out or premature aging of caulking material contained within the container after it has been opened. In this regard, the caulk cartridge cap according to the present invention substantially departs from the conventional concepts and designs of all of the closures and caps presently available, and in so doing provides a cap primarily developed for the purpose of facilitating the storage of unused portions of caulking material. More particularly, the present invention recognizes the need in the prior art for a new means of resealing caulk cartridge type containers and is thus designed to substantially fulfill this need.

SUMMARY OF THE INVENTION

In view of the foregoing disadvantages inherent in the known types of closures now present in the prior art, the present invention provides an improved closure construction wherein the same can be utilized to effectively reseal an opened caulk cartridge type container. As such, the general purpose of the present invention, which will be described subsequently in greater detail, is to provide a new and improved closure which has all the advantages of the prior art closures and none of the disadvantages.

To attain this, the present invention essentially comprises a caulk cartridge cap is designed to enable the storage of unused portions of products of the types supplied within caulk cartridge type containers to thus maintain them in a reusable condition. The cap operates as a closure for purposes of resealing a caulk type cartridge to prevent the premature drying out or aging of the materials stored within the cartridge and to also prevent blockage within the cartridge applicator tube. The cap includes an orifice retention rod which is positionable within the applicator tube, and a self-threading insert positioned within the cap is then used to threadably attach the cap to the cartridge. Modified embodiments of the cap include the use of a tether, a scraping edge formed on the orifice retention rod, and a bracket assembly to which the cap is rotatably attached and which may be mounted to a conventional caulk cartridge holding gun.

There has thus been outlined, rather broadly, the more important feature of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved closure which has all the advantages of the prior art closures and none of the disadvantages.

It is another object of the present invention to provide a new and improved closure which may be easily and efficiently manufactured and marketed.

It is a further object of the present invention to provide a new and improved closure which is of a durable and reliable construction.

An even further object of the present invention is to provide a new and improved closure which is susceptible of a low cost of manufacture with regard to both materials and labor, and which accordingly is then susceptible of low prices of sale to the consuming public, thereby making such closures economically available to the buying public.

Still yet another object of the present invention is to provide a new and improved closure which provides in the apparatuses and methods of the prior art some of the advantages thereof, while simultaneously overcoming some of the disadvantages normally associated therewith.

Still another object of the present invention is to provide a new and improved closure which is particularly designed for resealing a caulk cartridge type container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
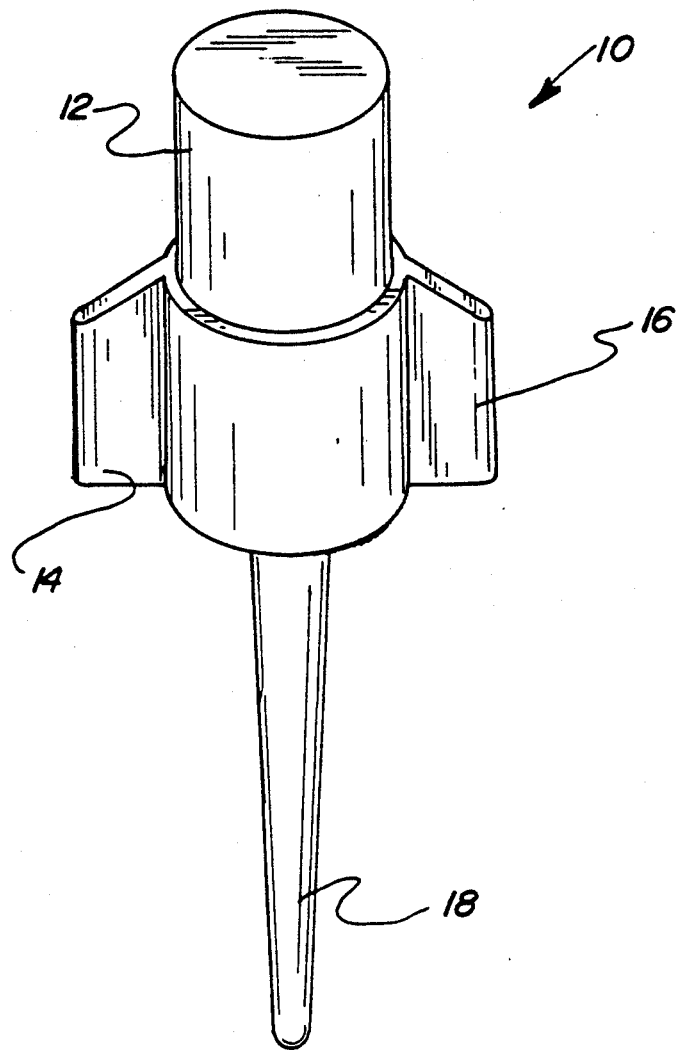
FIG. 1 is a perspective view of the caulk cartridge cap comprising the present invention.
Figure 2:
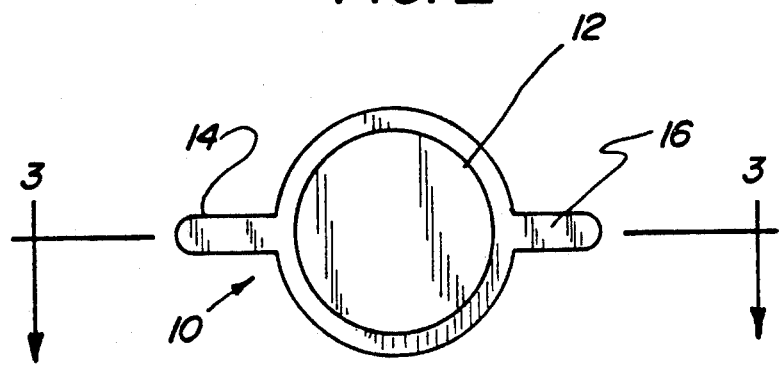
FIG. 2 is a top plan view of the cap.

With reference now to the drawings, and in particular to FIGS. 1 and 2 thereof, a new and improved caulk cartridge cap embodying the principles and concepts of the present invention and generally designated by the reference numeral 10 will be described.

More specifically, it will be seen that the caulk cartridge cap 10 essentially comprises a plug member 12 having integral outwardly extending wings 14, 16 which facilitate a manual manipulation of the plug member to include its rotatable attachment or disengagement to an applicator tube associated with a caulk cartridge type container.

Figure 3:
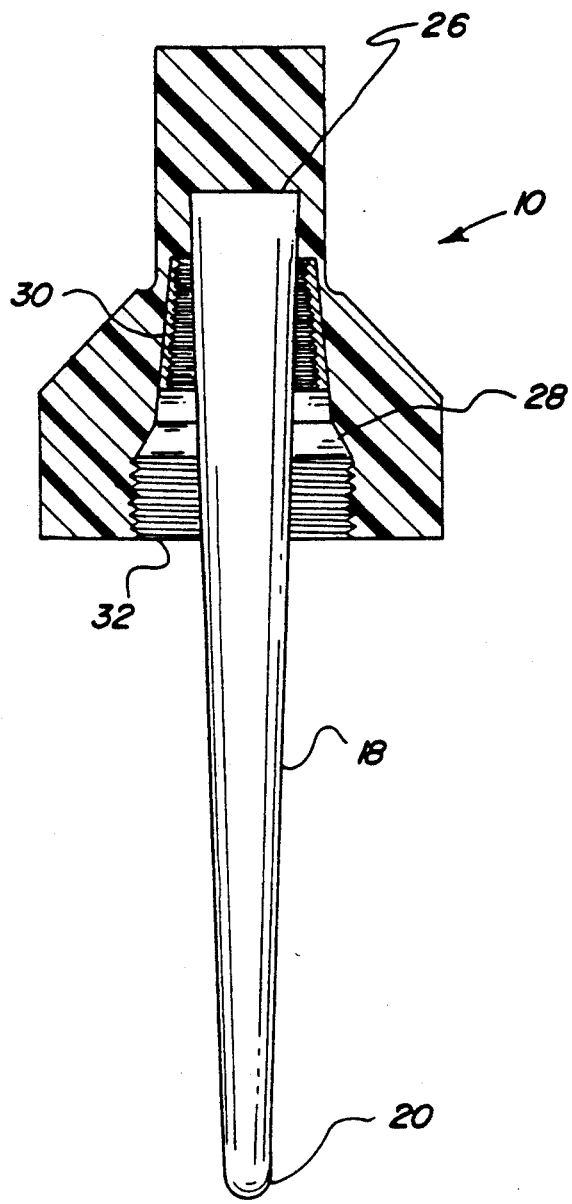
FIG. 3 is cross-sectional view of the cap as viewed along the line 3—3 in FIG. 2.

Reviewing FIG. 3 in conjunction with FIGS. 1 and 2, it will be seen that the plug member 12 and its integral wings 14, 16 can be integrally molded from a polymeric material around a downwardly extending tapered orifice retainment rod 18. In the preferred embodiment 10, the orifice retainment rod 18 would be manufactured from a metallic material so as to give it substantial strength and durability. However, it is within the intent and purview of the present invention to manufacture any of the components of the invention 10 from any known material which would permit the invention to function in its intended manner.

Figure 4:
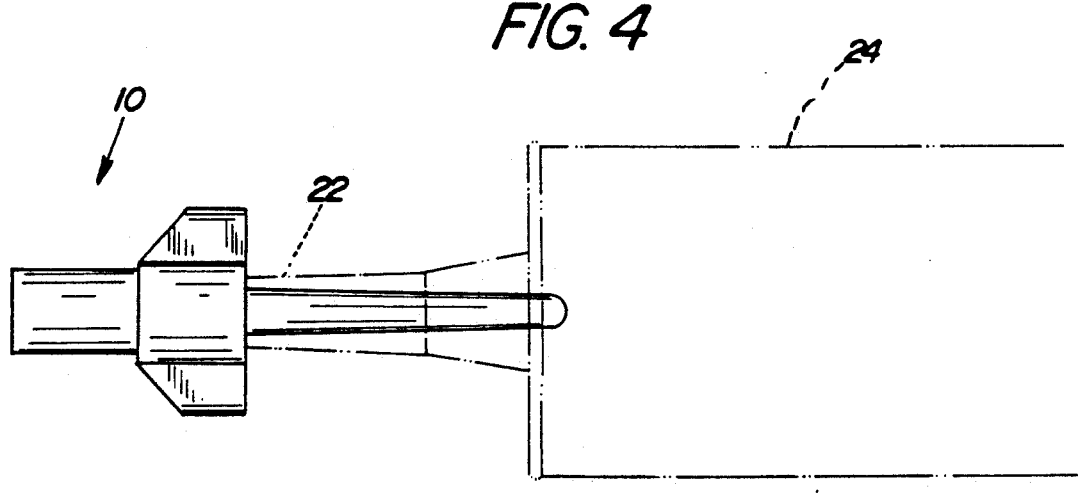
FIG. 4 is a side elevation view of the cap illustrating a use thereof.

With continuing reference to FIG. 3, it will be seen that the orifice retainment rod 18 has a rounded end 20 which facilitates a insertion of the rod into an applicator tube 22 forming a part of a caulk tube or cartridge 24, as best illustrated in FIG. 4, while the remaining end 26 of the rod is frictionally retained within an interior cavity 28 formed in the plug member 12. Also fixedly secured within the interior cavity 28 is a threaded metal insert 30 which is of a tubular design and which includes interior threads to facilitate an attachment of the invention 10 to an applicator tube 22. A larger diameter portion of the aperture 28 may also include integral interior threads 32. As such, the interior threads forming a part of the threaded metal insert 30 and the integral threads 32 facilitate a positioning of the caulk cartridge 10 over various diametrical sizes of an applicator tube 22.

In this regard, once a caulk tube 24 has been opened so as to allow a dispensing of the caulking material contained therein, any remaining caulking material may be resealed within the caulk tube by positioning the caulk cartridge cap 10 in the manner indicated in FIG. 4. More particularly, the orifice retainment rod 18 is forced down into the applicator tube 22 and a user then only needs to rotate the plug member 12 through a use of the convenient integral wings 14, 16 whereby either the threads on the threaded metal insert 30 or the integral threads 32 will engage the soft plastic material from which the applicator tube 22 is manufactured. This threaded engagement effectively locks the caulk cartridge cap 10 in position on the applicator tube 22 whereby an effective airtight seal is provided.

Figure 5:
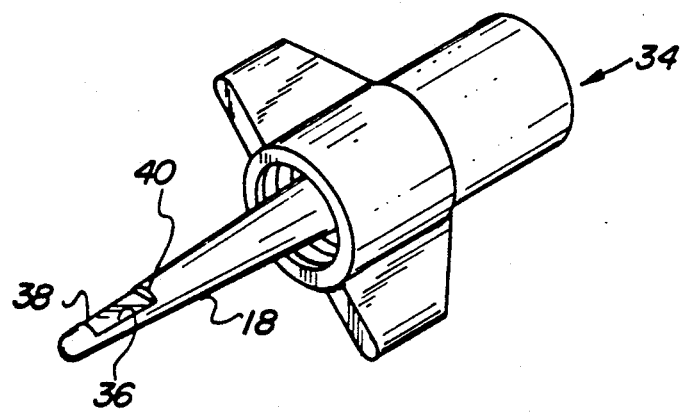
FIG. 5 is a perspective view of a modified embodiment of the invention.

FIG. 5 of the drawings illustrates a modified embodiment of the caulk cartridge cap wherein such modified embodiment is generally designated by the reference numeral 34. The embodiment 34 is substantially identical to the embodiment 10 with the exception that the orifice retention rod 18 is provided with a cutout section 36 which is of a rectangular shape and which forms a pair of oppositely disposed scraping edges 38, 40 on the rod. Through the use of these scraping edges 38, 40, the orifice retainment rod may additionally be used to scrape dried caulking material out of the applicator tube 22. The scraping edges 38, 40 break the dry material loose and much of this removed material can then be captured in the cutout section 36 so that upon a removal of the orifice retention rod from the applicator tube 22, the dried material can be dispensed therefrom.

Figure 6:
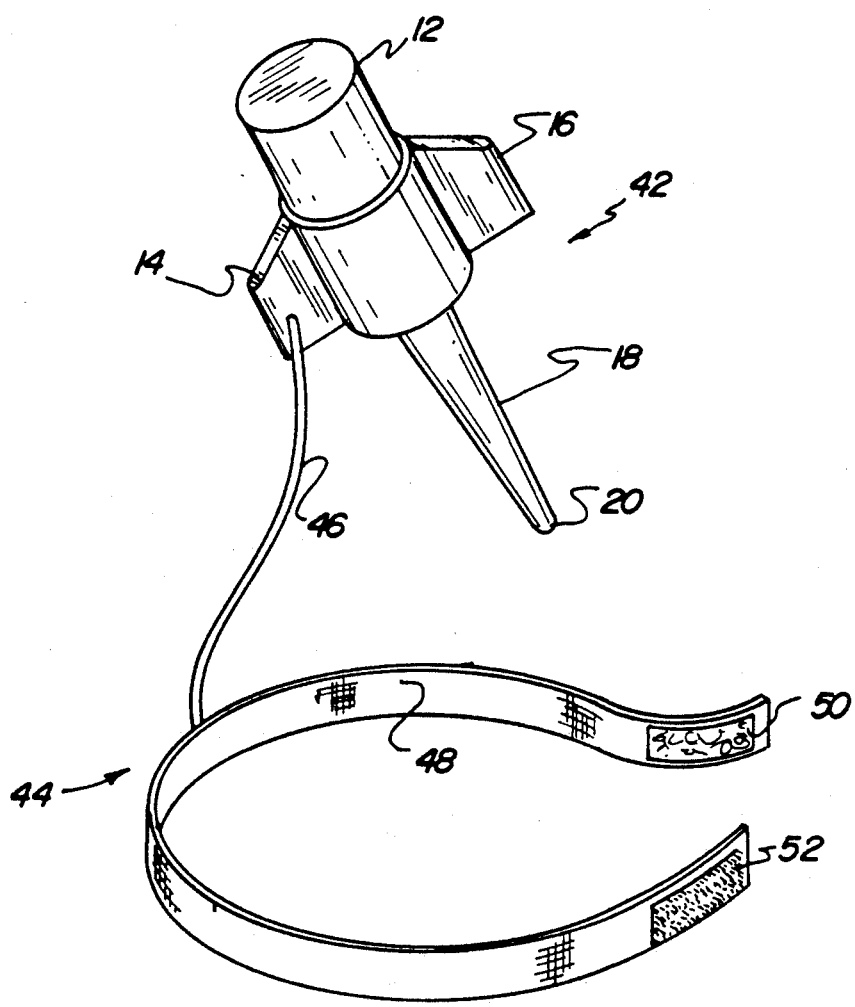
FIG. 6 is a perspective view of a third embodiment of the invention.

FIG. 6 of the drawings illustrates a further modified embodiment of the caulk cartridge cap comprising the present invention wherein this third embodiment of the invention is generally designated by the reference numeral 42. The embodiment 42 may include a cap having the structure of either embodiments 10 or 34 with the improvement comprising a tether 44. The tether 44 includes a length of flexible line 46 which may be fixedly secured to a wing 14 forming a part of the plug member 12, with the remaining free end of the flexible line then being attached to a flexible strap 48. The strap 48 may be provided with respective strips of hook and loop fasteners 50, 52 on free ends thereof, whereby the strap may be selectively positioned around a caulk cartridge holding gun 54 of the type illustrated in FIG. 7. Through a use of the tether 44, loss of either of the caps 10, 34 is prevented when they are not being utilized to plug an applicator tube 22.

Figure 7:
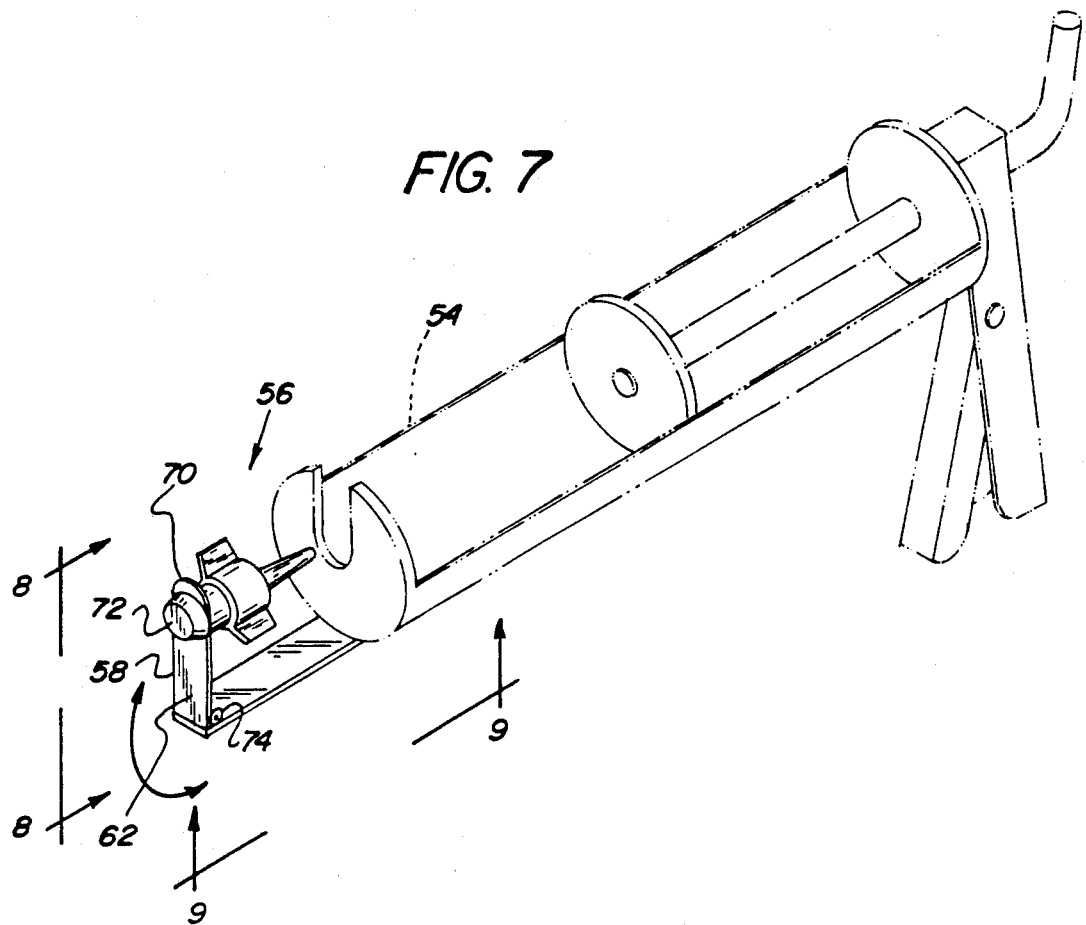
FIG. 7 is a perspective view of a fourth embodiment of the invention.
Figure 8:
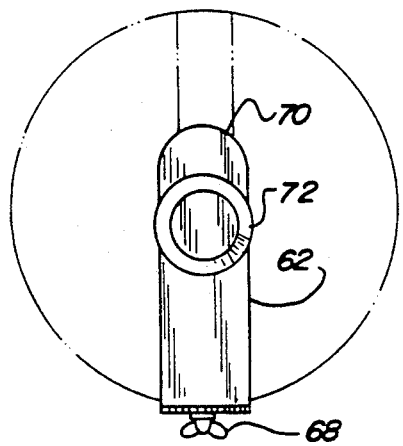
FIG. 8 is a cross-sectional view of the invention as viewed along the line 8—8 in FIG. 7.
Figure 9:
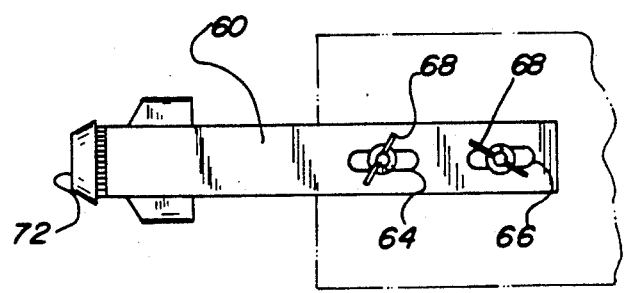
FIG. 9 is a cross-sectional view of the invention as viewed along the line 9—9 in FIG. 7.

FIGS. 7, 8 and 9 illustrate a fourth embodiment of the invention which is generally designated by the reference numeral 56. In this embodiment 56, either of the plugs 10, 34 are rotatably attachable to a bracket member 58. The bracket member 58 includes a first arm 60 and a second arm 62 hingedly attached thereto. The arm 60 is provided with one or more elongated slots 64, 66 which facilitate an attachment of the arm to a bottom section of a caulk gun 54 through the use of appropriate wing nut fasteners 68.

The arm 62 is provided with an unillustrated through-extending aperture in a top end 70 thereof whereby a flat top portion of a plug number 12 may be provided with a threaded interior aperture to receive a threaded fastener 72. More specifically, the threaded fastener 72 is threadably positionable in a top end of the plug member 12 through the unillustrated aperture and the arm 62, thereby to retain the cap 10, 34 in the position illustrated in FIG. 7. Additionally, this use of the threaded fastener 72 allows a rotatable movement of the cap 10, 34 as required to effect a threaded engagement with an applicator tube 22. When not being utilized to plug an applicator tube 22, a hinge 74 allows the arm 62 to be dropped down into axial alignment with the arm 60 so as not to interfere with an applicator tube 22 during a use thereof. The hinge 74 will facilitate a 180 degree movement of the arm 62 as to prevent all chances of interference and when a use of the cap 10, 34 is desired, it can be rotated upwardly into position while extensible movement of the arm 60 is afforded by a loosening of the wing nut 68. The bracket assembly 56 effectively acts as a tether similar to the flexible tether 44 illustrated in the third embodiment 42 of the invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved caulk cartridge closure comprising:
   a plug member;
   first thread means having a diameter formed upon a first interior surface of said plug member and being selectively threadably engagable with an open end of an applicator tube for coupling said plug member to said applicator tube;
   second thread means of a greater diameter than said diameter of said first thread means formed upon a second interior surface of said plug member and being selectively threadably engagable with an applicator tube of greater diameter than said applicable tube for coupling said plug member to said applicable tube of greater diameter;
   an orifice retainment rod attached to said plug member and being positionable within an orifice of said applicator tube forming a part of a caulk cartridge, said orifice retainment rod being of a tapered construction to thereby facilitate a more easy insertion of said orifice retainment rod into said applicator tube with a frictional engagement occurring between an interior surface of said applicator tube and an exterior surface of said orifice retainment rod as said orifice retainment rod is moved inwardly into said applicable tube; and
   gripping means coupled to said plug member for facilitating a manual rotation of said plug means, thereby to effect a secure engagement between said caulk cartridge closure and said applicator tube to thus effectively seal said caulk cartridge.

2. The new and improved caulk cartridge closure as described in claim 1, wherein said first thread means comprises a threaded metal insert frictionally retained within an interior cavity formed in said plug member.

3. The new and improved caulk cartridge closure as described in claim 2, and further including at least one scraping edge on said orifice retainment rod.

4. The new and improved caulk cartridge closure as described in claim 3, and further including tethering means for attaching said closure to a caulk cartridge assembly.

5. The new and improved caulk cartridge closure as described in claim 4, wherein said tethering means comprises a flexible strap.

6. The new and improved caulk cartridge closure as described in claim 4, wherein said tethering means comprises an adjustable bracket.

* * * * *